United States Patent
Cano-Ramirez

(10) Patent No.: US 9,825,342 B2
(45) Date of Patent: Nov. 21, 2017

(54) COOLING CONDUIT

(71) Applicant: RENAULT s.a.s., Boulogne-billancourt (FR)

(72) Inventor: Maria-Lourdes Cano-Ramirez, Nanterre (FR)

(73) Assignee: RENAULT s.a.s., Boulogne-billancourt (FR)

( * ) Notice: Subject to any disclaimer, the term of this patent is extended or adjusted under 35 U.S.C. 154(b) by 0 days.

(21) Appl. No.: 14/901,129

(22) PCT Filed: Jun. 13, 2014

(86) PCT No.: PCT/FR2014/051459
§ 371 (c)(1),
(2) Date: Feb. 4, 2016

(87) PCT Pub. No.: WO2014/207341
PCT Pub. Date: Dec. 31, 2014

(65) Prior Publication Data
US 2016/0248131 A1    Aug. 25, 2016

(30) Foreign Application Priority Data
Jun. 28, 2013 (FR) .................................... 13 56310

(51) Int. Cl.
*H01M 10/617* (2014.01)
*H01M 10/625* (2014.01)
(Continued)

(52) U.S. Cl.
CPC ....... *H01M 10/617* (2015.04); *H01M 10/613* (2015.04); *H01M 10/625* (2015.04);
(Continued)

(58) Field of Classification Search
CPC ............. H01M 10/617; H01M 10/625; H01M 10/6563; H01M 10/613; H01M 10/6556; H01M 10/6566; H01M 2220/20
See application file for complete search history.

(56) References Cited

U.S. PATENT DOCUMENTS 5,490,572 A * 2/1996 Tajiri ................. B60H 1/00278
180/65.1
2006/0093901 A1  5/2006 Lee et al.

FOREIGN PATENT DOCUMENTS

| DE | 10 2011 015 337 | 10/2012 |
| JP | 2000 243461 | 9/2000 |
| KR | 10 2005 0070727 | 7/2005 |

OTHER PUBLICATIONS

International Search Report dated Aug. 26, 2014 in PCT/FR14/051459 Filed Jun. 13, 2014.

(Continued)

*Primary Examiner* — Patrick Ryan
*Assistant Examiner* — Carmen Lyles-Irving
(74) *Attorney, Agent, or Firm* — Oblon, McClelland, Maier & Neustadt, L.L.P.

(57) ABSTRACT

A conduit for cooling a heating element includes an inlet mouth for entry of a fresh air flow, a plurality of cooling channels, the fresh air flow dividing between the channels into a plurality of air flows to collect heat produced by the heating element, an outlet mouth for an exit of a heated air flow, the heated air flow resulting from a merger of the plurality of air flows after the heat collection, and air deflectors in the outlet mouth facing the channel outlets situated closest to an exit opening of the outlet mouth relative to the other channel outlets to prevent at least one of the plurality of air flows from exiting the cooling channels. The air deflectors extend over lengths which reduce as distances from the opening of the outlet mouth increase to (Continued)

guide the air flows towards the exit opening of the outlet mouth.

5 Claims, 3 Drawing Sheets

(51) Int. Cl.
*H01M 10/6563* (2014.01)
*H01M 10/613* (2014.01)
*H01M 10/6556* (2014.01)
*H01M 10/6566* (2014.01)
*B60K 11/06* (2006.01)
*B60K 1/00* (2006.01)

(52) U.S. Cl.
CPC ... *H01M 10/6556* (2015.04); *H01M 10/6563* (2015.04); *H01M 10/6566* (2015.04); *B60K 11/06* (2013.01); *B60K 2001/005* (2013.01); *H01M 2220/20* (2013.01)

(56) References Cited

OTHER PUBLICATIONS

French Search Report dated Mar. 19, 2014 in Application No. FR 1356310 Filed Jun. 28, 2013.

* cited by examiner

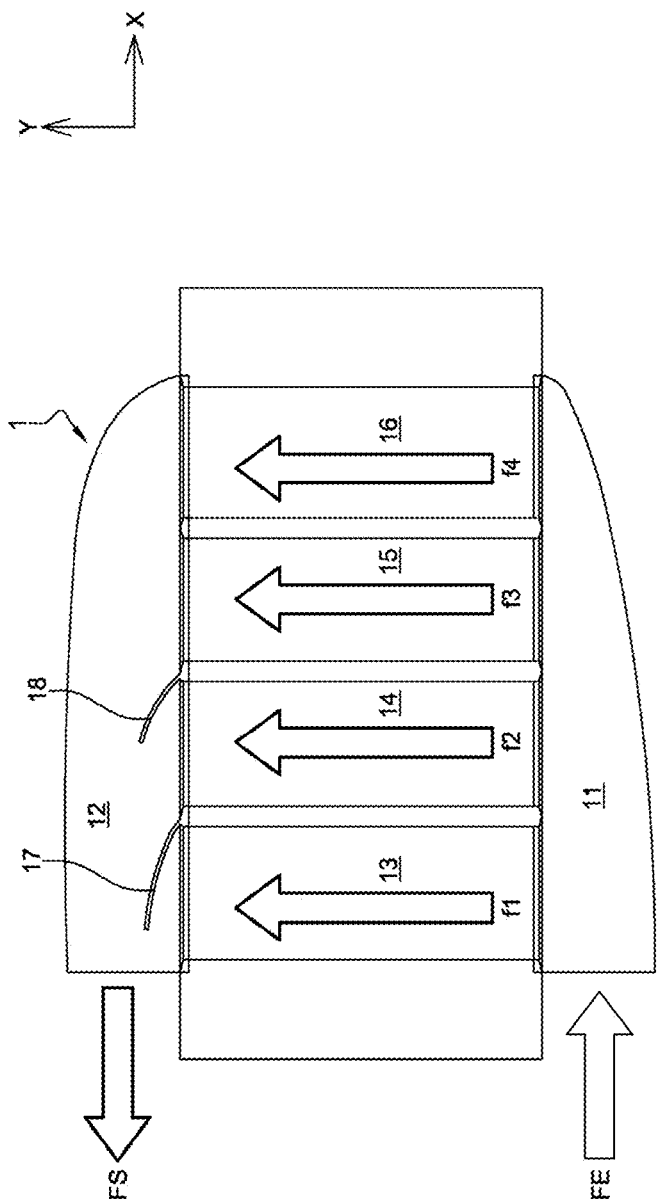

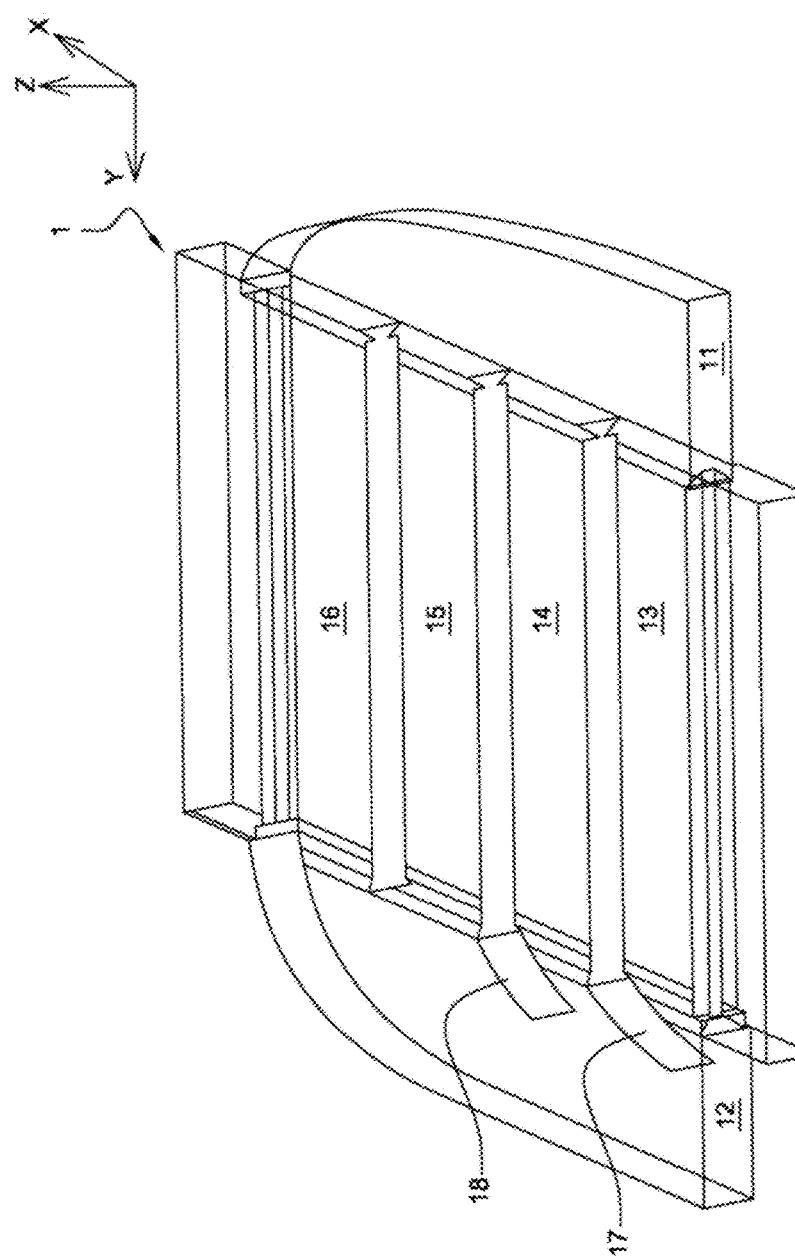

COOLING CONDUIT

BACKGROUND

The present invention concerns a cooling conduit. It applies in particular, but not exclusively, to the cooling of the batteries of electric or hybrid motor vehicles.

In the present context of consensus about climate change, the reduction in carbon dioxide ($CO_2$) emissions is a major challenge facing motor vehicle manufacturers, as standards are becoming ever more stringent in this field.

In addition to the constant improvement in the efficiency of conventional internal combustion engines, which is accompanied by a fall in $CO_2$ emissions, electric vehicles (EV) and hybrid electric vehicles (HEV) are today regarded as the most promising solution for reducing $CO_2$ emissions.

Various technologies for electrical energy storage have been tested in recent years in order to meet the needs of EVs. It appears today that lithium-ion (Li-ion) cell batteries achieve the best compromise between power density, which promotes performance in terms of acceleration in particular, and energy density, which promotes autonomy. However, this Li-ion technology cannot be used to create traction batteries for EVs without numerous difficulties, in particular if we consider the voltage levels necessary, of the order of 400 Volts (V), and the temperature levels produced. In fact, the migration of lithium ions between the electrodes of an Li-ion cell, whether on discharge when the vehicle is running or on charge when connected to an electrical distribution network, is an exothermic reaction: there is naturally a rise in the cell temperature. But this temperature rise of the cells must nonetheless be controlled since their performance, in particular in terms of power and autonomy, and their useful life depend on the usage conditions, in particular on the operating temperature. The cells, which are furthermore enclosed in a semi-sealed housing normally known as a "pack" or "battery pack", must therefore be kept within a substantially optimal operating temperature range, both on charging and on discharging. In particular, if the temperature is too high, the cell life will be reduced. This is a problem which the present invention proposes to solve.

One conventional solution is cooling by forced convection as described in patent EP 1031451, for example: the battery pack is situated below the floor of the vehicle and is cooled by a device comprising an inlet conduit for introducing fresh air into the pack, an outlet conduit for evacuating heated air from the pack, and a fan arranged half-way along the outlet conduit to force the circulation of air in the pack by aspiration. One drawback of this solution is that, by forcing the air flow rate in the pack by aspiration, the turbulence phenomena are amplified and disrupt the homogeneity of the air flow rate in the pack. As a direct consequence, the cooling in the pack becomes heterogeneous: as a function of their position in the pack, certain cells are better cooled than others, the air flow rate they receive varying with their location. An indirect consequence is that the performance of the cells varies heterogeneously in the short term, since the performance of a cell in terms of both power and autonomy depends on its temperature. Another indirect consequence is that the life of the cells develops heterogeneously in the long term, as the cells which are not cooled as well age faster. This is a problem which the present invention proposes to solve.

Patent application DE 10 2011 015 337 A1 discloses a method and a device for monitoring the temperature of a battery, which has the same drawbacks linked to the heterogeneity of cooling as patent EP 1031451.

BRIEF SUMMARY

The particular object of the invention is to resolve said drawbacks, in particular to homogenize the air flow in the battery pack. To this end, the object of the invention is a conduit for cooling a heating element. It comprises an inlet mouth for the entry of a fresh air flow, and a plurality of cooling channels, the fresh air flow dividing between said channels into a plurality of air flows to collect there heat produced by the heating element, and an outlet mouth for the exit of a heated air flow, the heated air flow resulting from the merger of the plurality of air flows after the collection of heat. The conduit comprises, arranged in the outlet mouth, means for preventing the exit from the cooling channels of at least one of the air flows of the plurality.

In a preferred embodiment, the means for preventing the exit of the air flows from the cooling channels may be arranged in the outlet mouth facing the channel outlets situated closest to the exit opening of the outlet mouth relative to the other channel outlets.

Advantageously, the means for preventing the exit of the air flows from the cooling channels may include air deflectors extending over predefined lengths in the outlet mouth facing the channel outlets, so as to guide said air flows towards the exit opening of the outlet mouth.

Advantageously, the lengths of the deflectors may reduce as their distances from the opening of the outlet mouth increase.

Advantageously, the deflectors may be curved such that their curvatures prevent the exit of the air flows from the cooling channels.

Advantageously, the radius of curvature of the deflectors may increase as their distances from the opening of the outlet mouth increase.

The object of the present invention is also a battery pack comprising a plurality of electrochemical energy storage cells constituting a heating element, this pack comprising a conduit as claimed in any of the preceding claims for cooling the plurality of cells.

The present invention furthermore has the main advantage that the addition of deflectors according to the invention is possible for any conduit geometry.

BRIEF DESCRIPTION OF THE DRAWINGS

Further characteristics and advantages of the invention will appear from the description which follows, given in relation to the attached drawings which show:

FIG. 1, in a top view, an exemplary air conduit according to the invention for cooling a battery pack;

FIG. 2, in a perspective view, the same exemplary air conduit according to the invention;

DETAILED DESCRIPTION

Figure 3B:
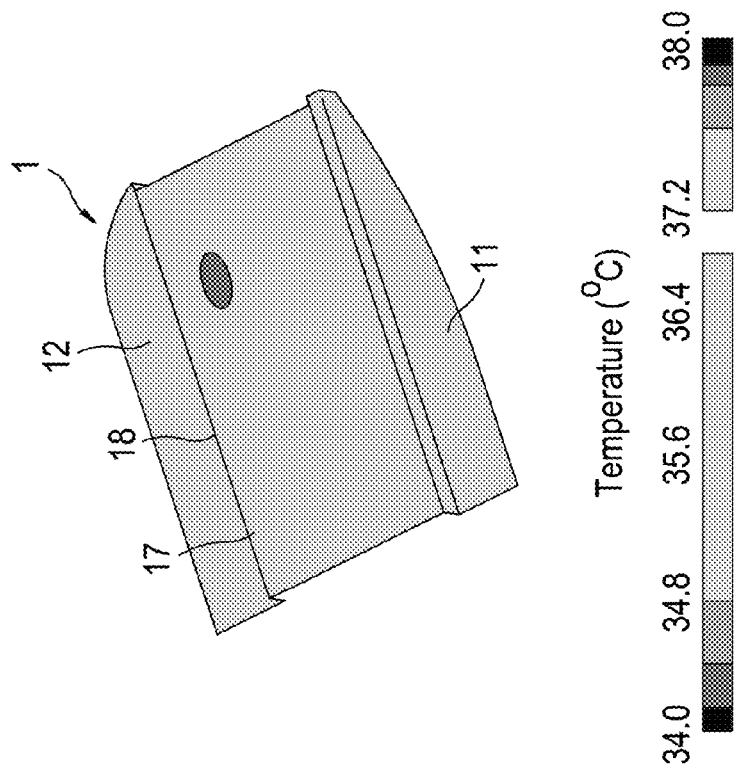
FIGS. 3a and 3b, in perspective views, respectively the temperature distribution in a battery pack without an air conduit according to the invention, and the temperature distribution in the battery pack comprising the air conduit according to the invention, illustrated on FIGS. 1 and 2.

FIGS. 1 and 2 illustrate diagrammatically, in a top view and a perspective view respectively, an exemplary air conduit 1 according to the invention for cooling a battery pack. It is made of a material with a high thermal conductivity, a metal alloy for example, or else a plastic material. It is intended to be arranged in the battery pack (not shown on the figures), which may be made from a plastic material. The air conduit 1 comprises a mouth 11 for the entry of a fresh air flow FE. The inlet opening of the mouth 11 is intended to be housed in an opening made in the battery pack, in order to allow the entry of air into the pack via the mouth 11. The air conduit 1 also comprises a mouth 12 for the exit of a heated air flow FS. The outlet opening of the mouth 12 is intended to be housed in another opening made in the battery pack, in order to allow the exit of air from the pack via the mouth 12. The air conduit 1 finally comprises channels 13, 14, 15 and 16 which connect the inlet mouth 11 to the outlet mouth 12.

Thus in the example of FIGS. 1 and 2, the fresh air flow FE enters the pack via the mouth 11 in a substantially horizontal direction X. The flow FE is then divided into four flows f1, f2, f3 and f4 which circulate in channels 13, 14, 15 and 16 respectively, following a direction Y orthogonal to X in the horizontal plane. Flows f1, f2, f3 and f4 absorb heat in contact with the walls of the channels 13, 14, 15 and 16 respectively, the Li-ion cells (not shown on the figures) being arranged flat or in fields in contact with the walls of the channels 13, 14, 15 and 16 above or below the conduit 1. Once heated by the absorption of heat, the four flows f1, f2, f3 and f4 merge to form the heated air flow FS. The air flow FS leaves the pack via the mouth 12 following the direction opposite to X.

According to the invention, curved deflectors 17 and 18 are arranged in the outlet mouth 12 facing the exit opening of channels 13 and 14 respectively. The curved deflectors 17 and 18 have the primary function of promoting the passage of air through channels 15 and 16 to the detriment of channels 13 and 14, while preventing the exit of air flows f1 and f2 from channels 13 and 14 respectively. In fact, by preventing the exit of air flows f1 and f2 from channels 13 and 14 respectively, the deflectors 17 and 18 create an over-pressure in channels 13 and 14, the consequence of which is that the air forming the inlet flow FE becomes oriented preferentially towards channels 15 and 16 where the pressure is lower. The curved deflectors 17 and 18 also have the function, once flows f1 and f2 have exited from channels 13 and 14 respectively "by force", of guiding said flows to the exit opening of the mouth 12, in order to limit their effect on the pressure rise in the outlet mouth 12 since this pressure rise prevents the free exit of flows f4 and f3 in the mouth 12 and hence increases the pressure in channels 15 and 16.

Thus a principle of the invention is to promote the passage of fresh air in the channels furthest away from the inlet opening of the mouth 11. Thus initially the passage of air is promoted in channels 16 and 15 to the detriment of the passage of air in channels 13 and 14 by arranging deflectors at the outlet of channels 13 and 14, namely deflectors 17 and 18 respectively, but not at the outlet of channels 15 and 16. Secondly, the passage of air is promoted in channel 14 to the detriment of the passage of air in channel 13, the deflector 17 arranged at the outlet of channel 13 being longer and having a greater radius of curvature than deflector 18 arranged at the outlet of channel 14. In fact, since the deflector 17 is longer and its radius of curvature greater, it produces a greater "plug" effect than the deflector 18 and hence creates a greater over-pressure in channel 13 than in channel 14, and hence the air from the inlet flow FE which has not entered either channel 16 or channel 15 becomes oriented preferentially toward channel 14 rather than toward channel 13. It is therefore firstly the presence or absence of the deflector at the outlet of a channel, then secondly the geometry of the deflectors which determine the order of preference amongst channels 13 to 16. The deflectors form, with direction Y taken by flows f1, f2, f3 and f4 in channels 13 to 16 respectively, an angle of less than 90° (a theoretical angle which corresponds to total closure of channels 13 to 16) and greater than 0° (a theoretical angle which corresponds to total opening of channels 13 to 16). The radius of curvature and the length of the deflectors depend in each case in particular on the space available in the conduit.

Figure 3A:
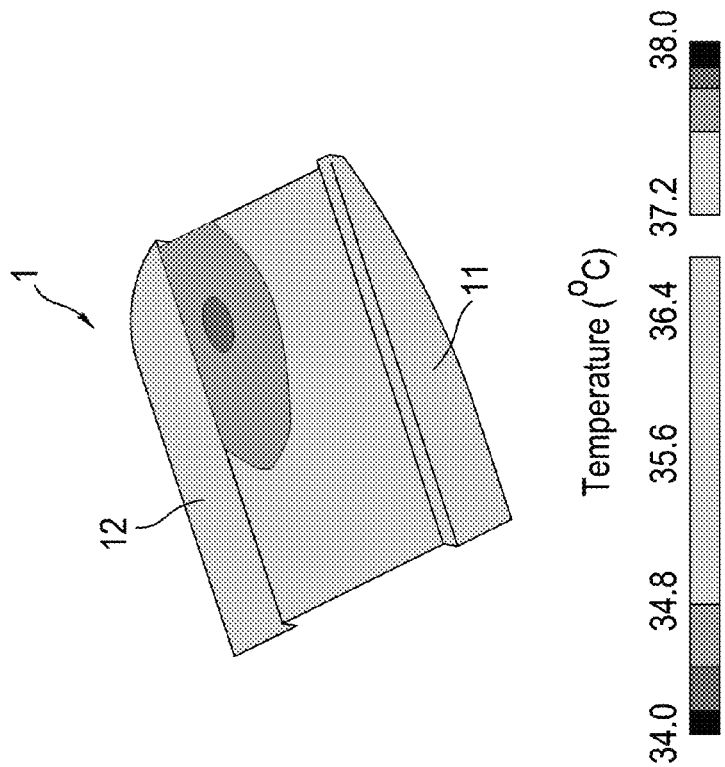

FIGS. 3a and 3b illustrate, in perspective views, respectively the temperature distribution in a battery pack without an air conduit according to the invention and the temperature distribution in the battery pack comprising the air conduit 1 according to the invention, already illustrated in FIGS. 1 and 2 above. In fact, the applicant was able to measure that the invention allows a reduction in the spread of air flow from 40% in the conduit shown in FIG. 3a, i.e. the flow is 40% higher in certain zones than in others, to only 17% in the conduit 1 also depicted in FIG. 3b. Thus the temperature distribution illustrated in FIGS. 3a and 3b shows not only that the invention allows a reduction from a maximum local temperature of the order of 37.7° C. to a maximum local temperature of the order of 37.4° C., but also that it achieves a far more homogenous temperature distribution.

The invention claimed is:

1. A conduit for cooling a heating element, the conduit comprising:
   an inlet mouth for an entry of a fresh air flow;
   a plurality of cooling channels that divide the fresh air flow into a plurality of air flows to collect heat produced by the heating element, the plurality of cooling channels including a first cooling channel, a second cooling channel, and a third cooling channel;
   an outlet mouth that receives a heated air flow from each of the plurality of cooling channels, the heated air flow resulting from a merger of the plurality of air flows after collection of the heat;
   a first air deflector extending from an outlet of the first cooling channel into the outlet mouth and a second air deflector extending from an outlet of the second cooling channel into the outlet mouth;
   wherein the first cooling channel is closer to an exit opening of the outlet mouth than the second cooling channel and the second cooling channel is closer to the exit opening of the outlet mouth than the third cooling channel,
   wherein the third cooling channel does not include an air deflector extending from an outlet of the third cooling channel, and
   wherein the first air deflector and the second air deflector are positioned to prevent an exit of the heated air flows from the first cooling channel and the second cooling channel, said first air deflector having a length that is greater than a length of the second air deflector so as to guide said air flows towards the exit opening of the outlet mouth.

2. The cooling conduit as claimed in claim 1, wherein the first air deflector and the second air deflector are curved to prevent the exit of the heated air flows from the first cooling channel and the second cooling channel.

3. The cooling conduit as claimed in claim 2, wherein a radius of curvature of the first air deflector is greater than a radius of curvature of the second air deflector.

4. A battery pack comprising:
   a plurality of electrochemical energy storage cells constituting a heating element; and
   the cooling conduit as claimed in claim 1 to cool the plurality of cells.

5. The cooling conduit as claimed in claim 1, further comprising:

a fourth cooling channel positioned further from the exit opening of the outlet mouth than the third cooling channel, and the fourth cooling channel does not include an air deflector extending from an outlet of the fourth cooling channel.

\* \* \* \* \*